United States Patent [19]

Mark

[11] 4,267,305
[45] May 12, 1981

[54] PROCESS FOR PREPARING POLYCARBONATES USING NITROGEN CROWN-CYCLIC COMPOUNDS AS CATALYSTS

[75] Inventor: Victor Mark, Evansville, Ind.

[73] Assignee: General Electric Company, Pittsfield, Mass.

[21] Appl. No.: 107,724

[22] Filed: Dec. 28, 1979

[51] Int. Cl.$^3$ ............................................. C08G 63/62
[52] U.S. Cl. ................................... 528/199; 528/126; 528/175; 528/182; 528/198
[58] Field of Search ............... 528/199, 198, 126, 175, 528/182

[56] References Cited
U.S. PATENT DOCUMENTS
4,116,887  9/1978  Lehn et al. ............................ 528/408

Primary Examiner—Harold D. Anderson

[57] ABSTRACT

An interfacial polymerization process for preparing a high molecular weight aromatic carbonate polymer by reacting a dihydric phenol with a carbonate precursor in the presence of a catalytic amount of a nitrogen-containing crown-cyclic compound.

12 Claims, No Drawings

PROCESS FOR PREPARING POLYCARBONATES USING NITROGEN CROWN-CYCLIC COMPOUNDS AS CATALYSTS

This invention is directed to an interfacial polymerization process for preparing high molecular weight aromatic polycarbonates which comprises reacting under interfacial polycarbonate-forming conditions a dihydric phenol and a carbonate precursor in the presence of a catalytic amount of a nitrogen crown-cyclic compound.

BACKGROUND OF THE INVENTION

Polycarbonates are well known thermoplastic materials finding a wide range of uses, particularly for injection molding applications and as glazing sheet for replacement of window glass. The interfacial polymerization technique, which is one of the methods employed in preparing a polycarbonate, involves reacting a dihydric phenol and a carbonate precursor in the presence of an aqueous caustic solution containing an alkali or alkaline earth metal hydroxide, and an inert organic solvent medium which is a solvent for the polycarbonate as it is formed. While the interfacial polymerization process is generally effective in producing polycarbonates, it does, in general, suffer from two disadvantages. Firstly, the rate of reaction is relatively slow. Secondly, there is a general difficulty in producing high molecular weight aromatic polycarbonates, i.e., those having a weight average molecular weight of about 15,000 to greater. Many techniques, such as those employing ultrasonic waves during the reaction, have been employed to remedy these two disadvantages. These techniques have not always proved to be entirely effective and involve the use of cumbersome and expensive equipment. It is advantageous economically to speed up the reaction and to produce high molecular weight aromatic polycarbonates without having to employ extra equipment or more severe reaction conditions. One such method is the use of catalysts in the interfacial polymerization process.

However, there is generally relatively little known about effective catalysis of polycarbonate reactions. The prior art discloses that certain compounds such as tertiary and quaternary amines and their salts (U.S. Pat. No. 3,275,601), guanidine compounds (U.S. Pat. No. 3,763,099), and ammonia and ammonium compounds (U.S. Pat. No. 4,055,544) are effective catalysts for the interfacial polymerization process for producing polycarbonates. However, the prior art also teaches that certain organic nitrogen compounds function as molecular weight regulators or chain terminators in the polycarbonate reactions. Thus, the afore-mentioned U.S. Pat. No. 3,275,601 discloses that aniline and methyl aniline function as chain terminators in the polycarbonate reaction, while U.S. Pat. No. 4,001,184 discloses that primary and secondary amines are effective molecular weight regulators. Furthermore, U.S. Pat. No. 4,111,910 teaches that ammonia, ammonium compounds, primary amines, and secondary amines function as chain terminators in the formation of polycarbonates via the interfacial polymerization process, and U.S. Pat. No. 3,223,678 teaches that monoethanolamine and morpholine act to break the polycarbonate chain thereby resulting in lower molecular weight polycarbonates.

DESCRIPTION OF THE INVENTION

This invention is directed to an interfacial polymerization process for producing high molecular weight aromatic carbonate polymers wherein a dihydric phenol is reacted with a carbonate precursor in the presence of an aqueous caustic solution containing an alkali metal or alkaline earth metal hydroxide and a catalyst which is a nitrogen-containing crown-cyclic compound.

The reaction of a dihydric phenol such as 2,2-bis(4-hydroxyphenyl)propane with a carbonate precursor such as phosgene results in a high molecular weight aromatic polycarbonate polymer consisting of dihydric phenol derived units bonded to one another through carbonate linkages. The reaction is carried out in the presence of an aqueous caustic solution containing the alkali and alkaline earth metal hydroxide as acid acceptors and an inert organic solvent medium which is a solvent for the polycarbonate as it is formed. Generally, a molecular weight regulator is also present to control the molecular weight of the polycarbonate polymer. In the process of the present invention, a nitrogen containing crown-cyclic compound is present and acts as an effective catalyst to speed up the reaction between the carbonate precursor and the dihydric phenol.

The high molecular weight aromatic carbonate polymers produced in accordance with the practice of this invention include carbonate homopolymers of dihydric phenols or carbonate copolymers of two or more different dihydric phenols. Additionally, the production of high molecular weight thermoplastic randomly branched polycarbonates and copolyester-polycarbonates are included within the scope of this invention. The randomly branched polycarbonates are prepared by coreacting a polyfunctional organic compound with the afore-described dihydric phenol and carbonate precursor.

The dihydric phenols employed in the practice of this invention are known dihydric phenols in which the sole reactive groups are the two phenolic hydroxyl groups. Some of these are represented by the general formula

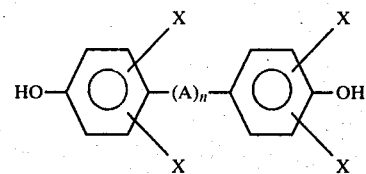

wherein A is a divalent hydrocarbon radical containing 1-15 carbon atoms, —S—, —S—S—,

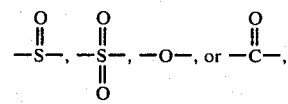

X is indepently hydrogen, halogen, or a monovalent hydrocarbon radical such as an alkyl group of 1–4 carbons, an aryl group of 6–10 carbons such as phenyl, tolyl, xylyl, naphthyl, an oxyalkyl group of 1–4 carbons or an oxyaryl group of 6–10 carbons and n is 0 or 1.

Typical of some of the dihydric phenols that can be employed in the practice of the present invention are bisphenols such as bis(4-hydroxyphenyl)methane, 2,2-bis(4-hydroxyphenyl)propane (also known as bisphenol-A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3,5-dichloro-4-hydroxyphenyl)ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl)sulfone, bis(3,5-dimethyl-4-hydroxyphenyl)sulfone, etc., dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc., and dihydroxy diphenyl sulfides and sulfoxides such as bis(4-hydroxyphenyl)sulfide and bis(4-hydroxyphenyl)sulfoxide, bis-(3,5-dibromo-4-hydroxyphenyl)sulfoxide, etc. A variety of additional dihydric phenols are also available and are disclosed in U.S. Pat. Nos. 2,999,835, 3,028,365, and 3,153,008, all of which are incorporated herein by reference. It is, of course, possible to employ two or more different dihydric phenols or a copolymer of a dihydric phenol with glycol or with hydroxy or acid-terminated polyester, or with a dibasic acid in the event a polycarbonate copolymer or interpolymer rather than a homopolymer is desired for use in the preparation of the polycarbonate polymers of this invention. Also employed in the practice of this invention are blends of any of the above dihydric phenols, the preferred dihydric phenol is bisphenol-A. The polyfunctional organic compounds which may be included within the scope of this invention are set forth in U.S. Pat. Nos. 3,635,895 and 4,001,184, which are incorporated herein by reference. These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives. Also included herein are blends of a linear polycarbonate and a branched polycarbonate.

The carbonate precursor can be either a carbonyl halide or a bishaloformate. The carbonyl halides include carbonyl bromide, carbonyl chloride, and mixtures thereof. The bishaloformates suitable for use include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

By adding monofunctional compounds which are capable of reacting with phosgene or with the end groups of the polycarbonates consisting of the chlorocarbonic acid ester group and which terminate the chains, such as the phenols, e.g., phenol, tertbutylphenyl, cyclohexylphenol, and 2,2-(4,4-hydroxyphenylene-4'-methoxyphenylene)propane, aniline and methylaniline, it is possible to regulate the molecular weight of the polycarbonates.

As mentioned hereinabove, the acid acceptor is an alkali or alkaline earth metal hydroxide. Illustrative of these acid acceptors are sodium hydroxide, lithium hydroxide, potassium hydroxide, calcium hydroxide and the like. The amount of said acid acceptor present should be sufficient to maintain the pH of the aqueous caustic solution above about 9.

Illustrative of the inert organic solvents which are present during the reaction and which dissolve the polycarbonate as it is formed are aromatic hydrocarbons and halogenated hydrocarbons such as benzene, toluene, xylene, chlorobenzene, orthodichlorobenzene, chloroform, methylene chloride, carbon tetrachloride, trichloroethylene and dichloroethane. The solvent is present in an amount effective to solubilize or dissolve substantially all of the polycarbonate as it is formed.

The catalytic compounds within the scope of the instant invention are the nitrogen crown-cyclic compounds represented by the general formulae

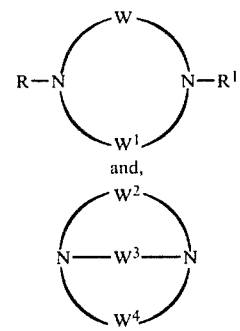

wherein W, $W^1$, $W^2$, $W^3$ and $W^4$ are independently selected from divalent heteroorganic radicals containing at least 5 atoms, preferably from 5 to about 14 atoms, selected from oxygen, nitrogen and carbon, with the proviso that for every one hetero atom, i.e., oxygen or nitrogen, present, there are present at least two carbon atoms. The carbon atoms present in W, $W^1$, $W^2$, $W^3$ and $W^4$ may be substituted with alkyl radicals, preferably alkyl radicals containing from 1 to about 20 carbon atoms, or they may be part of an alicyclic or aromatic ring. If nitrogen atoms are present in W–$W^4$, these nitrogen atoms may be, if they have an available bond, substituted with an alkyl radical, preferably one containing from 1 to about 20 carbon atoms. R and $R^1$ in Formulae I are independently selected from hydrogen and alkyl radicals, preferably alkyl radicals containing from 1 to about 20 carbon atoms.

Illustrative examples of the nitrogen crown-cyclic compounds, sometimes also referred to as crypts, represented by Formulae I and II include:

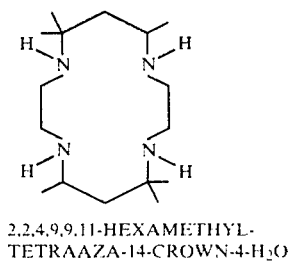

2,2,4,9,9,11-HEXAMETHYL-TETRAAZA-14-CROWN-4-H$_2$O

-continued

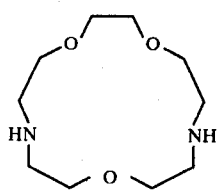

1,7,10-Trioxa-4,13-di-
azacyclopentadecane

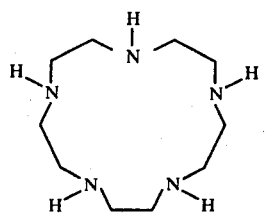

PENTAAZA-15-CROWN-5

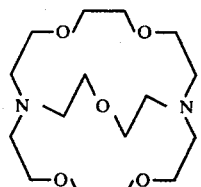

4,7,13,16,21-Pentaoxa-1,10-di-
azabicyclo[8.8.5.]tricosane

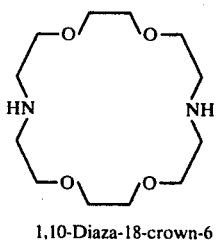

1,10-Diaza-18-crown-6

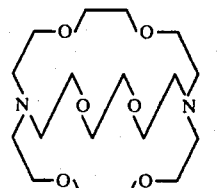

4,7,13,16,21,24-Hexaoxa-1,10-di-
azabicyclo[8.8.8]hexacosane

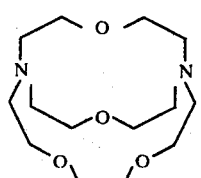

4,7,13,18-Tetraoxa-1,10-diaza-
bicyclo[8.5.5.]eicosane

-continued

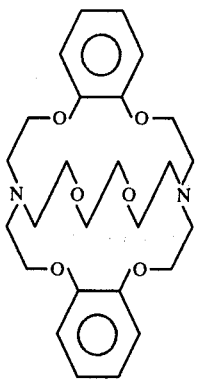

5,6,14,15-Dibenzo-4,7,13,16,21,24-hexaoxa-
1,10-diazabicyclo(8,8,8)-hexacosane

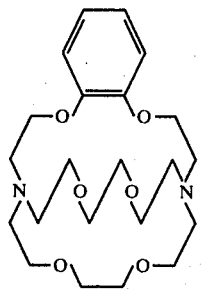

5,6-Benzo-4,7,13,16,21,24-hexaoxa-
1,10-diazabicyclo[8.8.8.]hexacosane

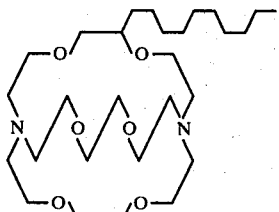

5-Decyl-4,7,13,16,21,24-hexaoxa-1,10-
diazabicyclo-(8,8,8)-hexacosane

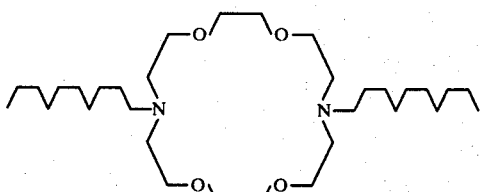

4,13-Didecyl-1-1,7,10,16-tetraoxa-4,13-diazacyclooctadecane

For convenience, some of the nitrogen crown-cyclic catalysts of Formula I and II are employed in the form of their mineral acid salts, preferably nitrate, nitrite, sulfate, sulfite, phosphate, phosphite, halide and hydrohalide salts.

Illustrative mineral acid salts of the nitrogen crown-cyclic compounds of Formula I and II include:

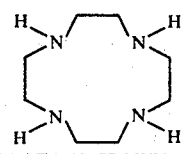

TETRAAZA-12-CROWN 4 . 4HCl

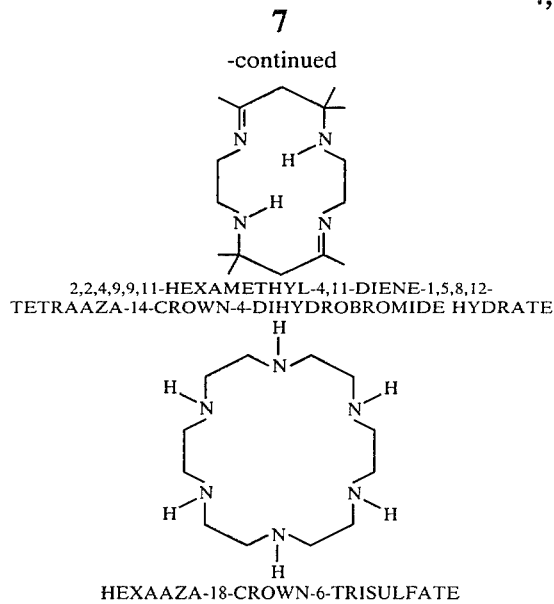

2,2,4,9,9,11-HEXAMETHYL-4,11-DIENE-1,5,8,12-
TETRAAZA-14-CROWN-4-DIHYDROBROMIDE HYDRATE

HEXAAZA-18-CROWN-6-TRISULFATE

The nitrogen crown-cyclic compounds represented by Formulae I and II are known compounds whose chemistry and preparation are well known to workers in the art. Thus, general methods of their preparation are described by J. J. Christensen, D. J. Etough, and R. M. Izatt in *Chemical Reviews*, Vol. 74, page 351 (1974).

The amount of the nitrogen crown-cyclic compound present during the reaction is a catalytic amount. By catalytic amount is meant an amount effective to catalyze the reaction between the dihydric phenol and the carbonate precursor to produce the polycarbonate. Generally, this amount ranges from about 0.01 to about 10 weight percent based on the weight of the dihydric phenol present.

The process of the instant invention is carried out by reacting a dihydric phenol, such as bisphenol-A, with a carbonate precursor, such as phosgene, in a reaction medium containing an aqueous caustic solution and an inert organic solvent for the polycarbonate and in the presence of a catalytic amount of the nitrogen crown-cyclic compound of Formulae I or II.

The temperature at which this reaction proceeds may vary from below 0° C. to about 100° C. The reaction proceeds satisfactorily at temperatures ranging from about room temperature (25° C.) to about 50° C. Since the reaction is exothermic, the rate of carbonate precursor addition may be used to control the reaction temperature. The amount of carbonate precursor, such as phosgene, required will generally depend upon the amount of dihydric phenol present. Generally, one mole of the carbonate precursor will react with one mole of dihydric phenol to provide the polycarbonate. When a carbonyl halide, such as phosgene, is used as the carbonate precursor, two moles of hydrohalic acid such as HCl are produced by the above reaction. These two moles of acid are neutralized by the alkali and alkaline earth metal hydroxide acid acceptor present. The foregoing are herein referred to as stoichiometric or theoretical amounts.

PREFERRED EMBODIMENT OF THE INVENTION

In order to more fully and clearly illustrate the present invention, the following examples are presented. It is intended that the examples be considered as illustrative rather than limiting the invention disclosed and claimed herein. In the examples, all parts and percentages are on a weight basis unless otherwise specified.

EXAMPLE 1

This example illustrates an unsuccessful attempt to prepare a polycarbonate polymer via the interfacial polymerization technique without the presence of a catalyst. To a reactor fitted with a reflux condenser and a mechanical agitator are charged 57 parts of 2,2-bis(4-hydroxyphenyl)propane, 157 parts of water, 325 parts of methylene chloride, and 1.2 parts of para-tertiary-butylphenol. Phosgene is then added to the reaction mixture at a rate of 0.65 parts per minute for a period of 30 minutes while maintaining the pH at 9 by the addition of a 15% aqueous sodium hydroxide solution. After 30 minutes, the pH is raised to 11.0 by the use of additional amounts of sodium hydroxide solution. Phosgenation is continued for a further 10 minutes at this pH. The material is recovered from the reaction and found to have an intrinsic viscosity of 0.12 dl./g. This indicates that no practical degree of polymerization is achieved.

EXAMPLE 2

The procedure of Example 1 is substantially repeated, except that the phosgenation is carried out in the presence of 0.6 gram of 2,2,5,9,9,11-hexamethyl-1,5,8,12-tetraaza-14-crown-4,11-diene dihydrobromide hydrate. The polycarbonate is recovered and is found to have an intrinsic viscosity of 0.34 dl./g. This indicates the formation of a high molecular weight aromatic polycarbonate.

EXAMPLE 3

The procedure of Example 1 is substantially repeated, except that the phosgenation is carried out in the presence of 0.72 gram of 1,10-dimethyl-1,10-diaza-4,7,13,16-tetraoxacyclooctadecane. The polycarbonate is recovered and is found to have an intrinsic viscosity of 0.56 dl./g. This value indicates the formation of a high molecular weight aromatic polycarbonate.

EXAMPLE 4

The procedure of Example 1 is substantially repeated, except that the para-tertiarybutylphenol of Example 1 is replaced with an equivalent amount of phenol and the phosgenation is carried out in the presence of 0.1 gram of 1,10-diaza-4,7,12,16,21,24-hexaoxabicyclo-[8.8.8]hexacosane. The polycarbonate is recovered and is found to have an intrinsic viscosity of 0.44 dl./g. This indicates the formation of a high molecular weight aromatic polycarbonate.

EXAMPLE 5

The procedure of Example 4 is substantially repeated, except that the phenol chain terminator of Example 4 is omitted. The polycarbonate is recovered and is found to have an intrinsic viscosity of 1.14 dl./g. This value is indicative of the formation of a very high molecular weight aromatic polycarbonate.

As can be seen by comparison of Example 1 with Examples 2-5, the use of the nitrogen crown-cyclic catalysts of the instant invention results in the production of high molecular weight aromatic polycarbonates via the interfacial polymerization technique, while in the absence of a catalyst, the interfacial polymerization technique is ineffective in producing high molecular weight aromatic polycarbonates under substantially identical reaction conditions.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What I claim is:

1. An interfacial polymerization process for preparing high molecular weight aromatic polycarbonates which comprises reacting, under interfacial polycarbonate-forming conditions, a dihydric phenol and a carbonate precursor in the presence of a catalytic amount of a catalyst selected from the group consisting of nitrogen crown-cyclic compounds and mineral acid salts of nitrogen crown-cyclic compounds.

2. The process of claim 1 wherein said catalyst is a nitrogen crown-cyclic compound.

3. The process of claim 2 wherein said nitrogen crown-cyclic compound is represented by the formula

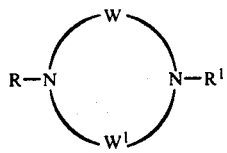

wherein R and $R^1$ are independently selected from the group consisting of hydrogen and alkyl radicals; and W and $W^1$ are independently selected from the group consisting of divalent heteroorganic radicals containing at least 5 atoms selected from the group consisting of oxygen, nitrogen and carbon, with the proviso that for every hetero atom present, there are present at least two carbon atoms.

4. The process of claim 3 wherein at least one carbon atom present in W or $W^1$ contains at least one alkyl substituent thereon.

5. The process of claim 3 wherein at least one carbon atom present in W or $W^1$ is part of an alicyclic or aromatic ring.

6. The process of claim 2 wherein said nitrogen crown-cyclic compound is represented by the general formula

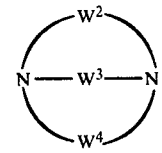

wherein $W^2$, $W^3$ and $W^4$ are independently selected from the group consisting of divalent heteroorganic radicals containing at least 5 atoms selected from the group consisting of carbon, nitrogen and oxygen, with the proviso that for every hetero atom present, there are present at least two carbon atoms.

7. The process of claim 6 wherein at least one carbon atom present in $W^2$, $W^3$ or $W^4$ contains at least one alkyl substituent thereon.

8. The process of claim 6 wherein at least one carbon atom present in $W^2$, $W^3$ or $W^4$ is part of an alicyclic or aromatic ring.

9. The process of claim 1 wherein said catalyst is a mineral acid salt of a nitrogen crown-cyclic compound.

10. The process of claim 1 wherein said catalyst is present in an amount of from about 0.01 to about 10 weight percent based on the weight of said dihydric phenol.

11. The process of claim 10 wherein said dihydric phenol is bisphenol-A.

12. The process of claim 11 wherein said carbonate precursor is phosgene.

* * * * *